(12) United States Patent
Timo et al.

(10) Patent No.: US 10,419,837 B2
(45) Date of Patent: Sep. 17, 2019

(54) LOUDSPEAKER SYSTEM FOR A VEHICLE AND VEHICLE STRUCTURE COMPRISING SUCH A LOUDSPEAKER SYSTEM

(71) Applicants: Alpine Electronics, Inc., Shinagawa-ku,Tokyo (JP); Blueprint Acoustics Pty Ltd., Endeavour Hills, Victoria (AU)

(72) Inventors: Esser Timo, Stuttgart (DE); Arata Tada, Stuttgart (DE)

(73) Assignees: ALPINE ELECTRONICS, INC., Tokyo (JP); BLUEPRINT ACOUSTICS PTY LTD., Victoria (AU)

( * ) Notice: Subject to any disclaimer, the term of this patent is extended or adjusted under 35 U.S.C. 154(b) by 0 days.

(21) Appl. No.: 15/603,132

(22) Filed: May 23, 2017

(65) Prior Publication Data
US 2017/0359639 A1   Dec. 14, 2017

(30) Foreign Application Priority Data
Jun. 14, 2016   (EP) ..................................... 16174418

(51) Int. Cl.
*H04R 1/02* (2006.01)
*B60R 11/02* (2006.01)
(Continued)

(52) U.S. Cl.
CPC .......... *H04R 1/025* (2013.01); *B60R 11/0217* (2013.01); *H04R 1/2819* (2013.01);
(Continued)

(58) Field of Classification Search
CPC .......... H04R 1/02; H04R 1/025; H04R 1/026; H04R 1/028; H04R 1/2803; H04R 1/2811;
(Continued)

(56) References Cited

U.S. PATENT DOCUMENTS

2003/0226712 A1* 12/2003 Nishikawa ............. H04R 1/025
181/199
2008/0310668 A1* 12/2008 Koch ................... B60R 11/0217
381/389
(Continued)

FOREIGN PATENT DOCUMENTS

DE   38 17 848 C1   9/1989
EP   2 620 328 A1   7/2013
(Continued)

*Primary Examiner* — Thang V Tran
(74) *Attorney, Agent, or Firm* — Brinks Gilson & Lione

(57) ABSTRACT

A loudspeaker system for a vehicle may include a vehicle partition panel that separates an interior space and an exterior space; a loudspeaker device comprising a frame, a diaphragm elastically supported at the frame, and a driving device that is configured to provide driving power for operating the diaphragm; and an air chamber disposed between the diaphragm and the vehicle partition panel. The frame delimits a chamber side opening of the air chamber facing the vehicle partition panel, where the vehicle partition panel comprises a vehicle partition panel opening. The vehicle partition panel opening has an extension which is smaller than the diameter of the diaphragm and smaller than an extension of the chamber side opening. The loudspeaker device is fixed to the vehicle partition panel such that the chamber side opening and the vehicle partition panel opening overlap in an overlapping area and the chamber side opening adjoins the vehicle partition panel opening.

6 Claims, 8 Drawing Sheets

(51) Int. Cl.
*H04R 1/28* (2006.01)
*H04R 7/18* (2006.01)
*H04R 1/34* (2006.01)
*B60R 11/00* (2006.01)

(52) U.S. Cl.
CPC .......... *H04R 1/2849* (2013.01); *H04R 1/345* (2013.01); *H04R 7/18* (2013.01); *B60R 2011/0003* (2013.01); *H04R 2400/11* (2013.01); *H04R 2499/13* (2013.01)

(58) Field of Classification Search
CPC .. H04R 1/2819; H04R 1/2826; H04R 1/2849; H04R 1/345; H04R 2400/11; H04R 2499/13; H04R 7/18; H04R 5/02; H04R 31/00; B06R 11/0217; B06R 2011/0003; B06R 2011/0005
See application file for complete search history.

(56) References Cited

U.S. PATENT DOCUMENTS

| | | |
|---|---|---|
| 2012/0219171 A1 | 8/2012 | Velican |
| 2013/0188806 A1 | 7/2013 | Tada |
| 2013/0272537 A1* | 10/2013 | Tada .................. H04R 9/022 381/86 |
| 2013/0284536 A1 | 10/2013 | Ito et al. |
| 2015/0098586 A1* | 4/2015 | Tanabe ............. H04R 1/2849 381/86 |

FOREIGN PATENT DOCUMENTS

| | | |
|---|---|---|
| EP | 2 654 319 A2 | 10/2013 |
| EP | 2 658 280 A1 | 10/2013 |
| JP | 11-225388 | 8/1999 |

* cited by examiner

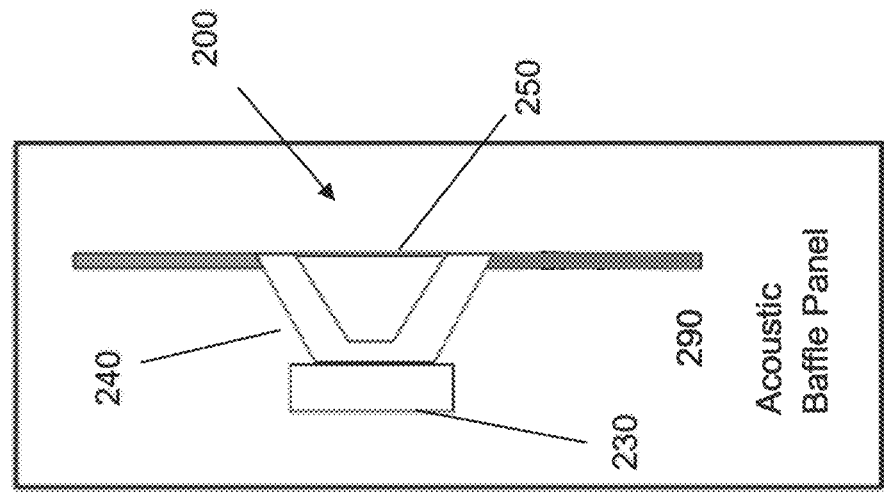
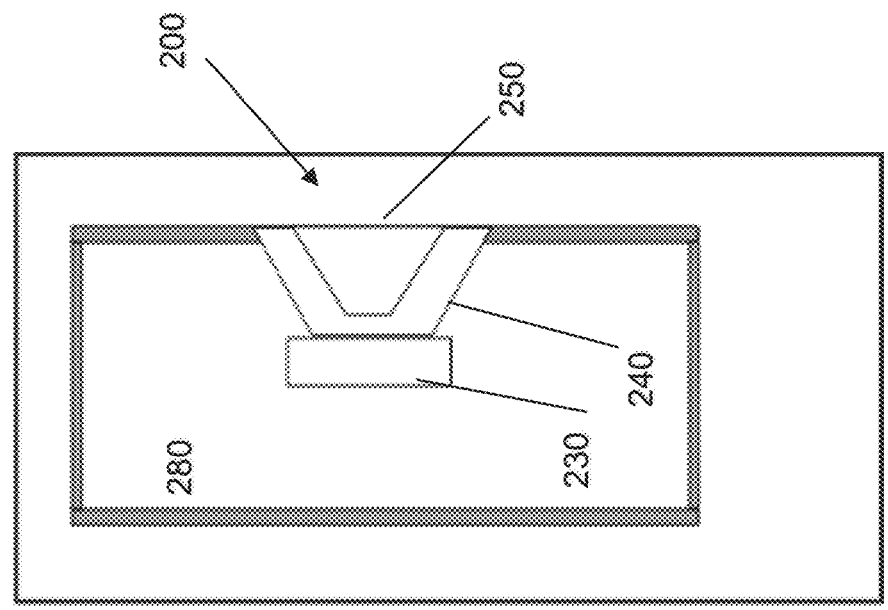
Fig. 1
Fig. 2
(Prior art)

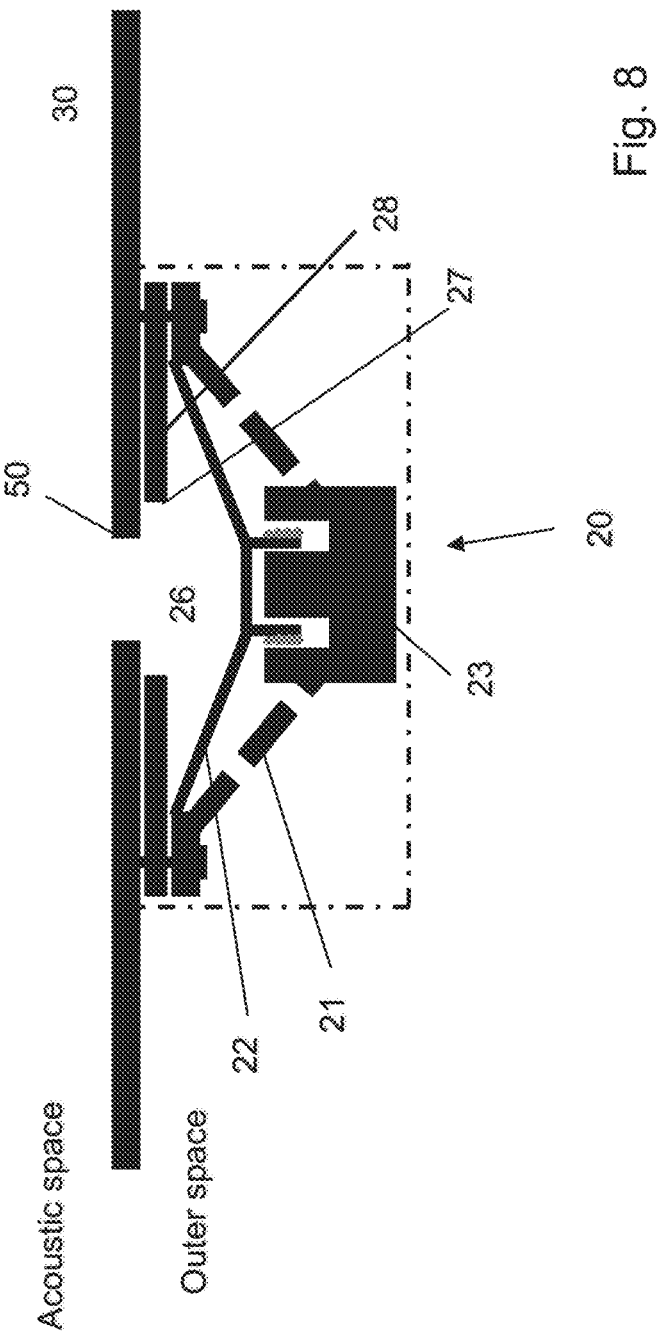

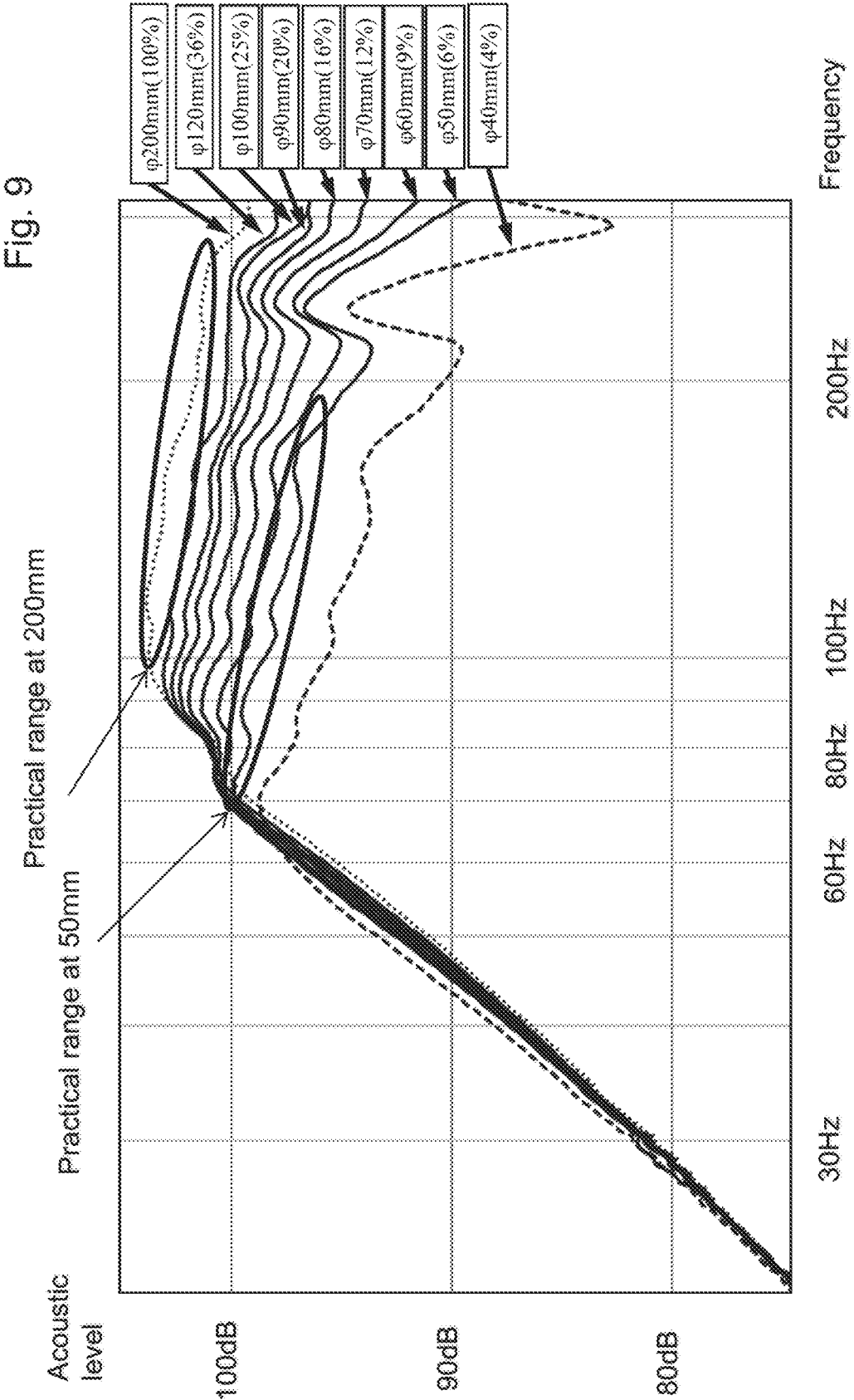

LOUDSPEAKER SYSTEM FOR A VEHICLE AND VEHICLE STRUCTURE COMPRISING SUCH A LOUDSPEAKER SYSTEM

RELATED APPLICATIONS

The present application claims priority to EP Patent Appln. No. 16174418.0, filed Jun. 14, 2016, the entire disclosure of which is hereby incorporated by reference.

BACKGROUND

Loudspeaker devices and systems, such as those situated in vehicle like cards, are commonly used for providing audio output to listeners. Electrical signals that are representative of various characteristics of sounds are transformed by a loudspeaker device into vibrating movements of a diaphragm. These movements of the diaphragm create sound waves that can be heard by listeners. A loudspeaker device typically employs a magnetic driving device causing a diaphragm elastically supported at a frame of the loudspeaker device to move back and forth. This vibration creates sounds that are produced by the loudspeaker. The frame may be enclosed by a housing of the loudspeaker device. When the loudspeaker device is a subwoofer, solutions are known in which an air communication duct connects an inner space of the housing to an outside space.

Low frequency loudspeakers are known which comprise a rear box. A loudspeaker box such as shown in FIG. 1 requires a relatively large space, typically 20 liters, for a high-performance subwoofer. The loudspeaker device 200 comprises a magnetic driving unit 230 and a frame 240 which is attached to a diaphragm 250. The loudspeaker device 200 is enclosed in a rear box 280. Space is always valuable in a vehicle, so that often current loudspeaker boxes are too small for a good performance. A well performing loudspeaker box is quite large, some being up to 50 liters in size.

U.S. Pat. No. 8,804,991 B2 discloses a loudspeaker assembly for use in a loudspeaker system having infinite baffle topology. The assembly comprises a driver including a cone and a basket and at least one Helmholtz resonator including a chamber and a vent duct communicating with the chamber and adapted to pass through the infinite baffle. The chamber is dimensioned to provide a tuned frequency well above an operating band associated with the driver. The cross-sectional area and length of the vent duct may be set to provide control over duct air noise and low frequency extension.

A speaker with baffle open at the rear, such as in FIG. 2, is typically only available in vehicles with a rear parcels shelf (sedan type body), so not all cars can have these. Such a loudspeaker device 200 also comprises a magnetic driving unit 230 and a frame 240 which is attached to a diaphragm 250. Here, the frame 240 is mounted to an acoustic baffle panel 290 having infinite baffle topology.

Another known solution is described in EP 2 941 011 A1. FIG. 3 depicts a subwoofer using a Helmholtz resonator tuned above the used bandwidth as a port to the outside of a closed space. FIG. 3 shows a known arrangement 100 of a loudspeaker device 200 which is installed at a wall of a vehicle including a vehicle panel 300 (such as a vehicle body) which has an opening 500 which is covered by a cap 400, such as made of plastic. The loudspeaker device 200 comprises a housing 210 including an air volume V10 which is communicated through an air communication duct 220 with an outside space V20 of the vehicle. The loudspeaker device 200 further comprises a magnetic driving unit 230 and a frame 240 having a radius a which is attached to a diaphragm 250.

Such an arrangement 100 enables the loudspeaker device 200 to be placed in small locations, such as in a vehicle side space adjacent to a vehicle panel. For providing the air communication duct 220, an opening 500 needs to be provided in the vehicle panel 300, which may be forming part of the vehicle body. Typically, such an opening 500 is a dedicated hole in a vehicle structure, such as a vehicle panel. Such a subwoofer is smaller, but needs a duct 220 through a vehicle partition panel separating an inside space from an outside space and an enclosure geometry for creating volume V10 to form a Helmholtz resonator. This may be difficult to implement regarding mechanical design.

FIG. 4 shows another known arrangement 100 of a loudspeaker device 200 which is installed at a wall of a vehicle including a vehicle partition panel 300 (such as a vehicle body) which has an opening 500, e.g. of circular shape. The loudspeaker device 200 comprises a frame 201, a diaphragm 202 elastically supported at the frame 201, and a magnetic driving device 203 including a voice coil 203a that provides driving power for operating the diaphragm 202. The frame 201 may be connected by a supporting bracket 204 to a chamber case 205 enclosing an air chamber 206 between the chamber case 205 and the diaphragm 202. A duct member forming an air communication duct 501, e.g. of circular shape, is connected to the chamber case 205 at a central opening thereof.

Accordingly, with vibration of the diaphragm 202, an air volume of air chamber 206 is communicated through air communication duct 501 with an outside space of the vehicle on the other side of the vehicle partition panel 300 forming an outer space, whereas the side of the vehicle partition panel 300 facing the loudspeaker device 200 is delimiting an acoustic space of the vehicle. Such an arrangement 100 enables the loudspeaker device 200 to be placed in locations such as in a vehicle side space adjacent to a vehicle panel. For providing the air communication duct 501, an opening 500 needs to be provided in the vehicle panel 300.

For example, as typically employed with such loudspeaker devices, the loudspeaker device 200 has a resonance frequency such as 100 Hz. At a frequency range over the resonance frequency, the sensitivity to driving power does not change largely according to change of driving frequency, and sound quality is good. But at a range under the resonance frequency (for example 20-100 Hz), the sensitivity to driving power changes largely according to change of driving frequency, and sound quality is bad.

EP 2 654 319 A2 discloses a speaker which includes a magnetic circuit, a voice coil, and a diaphragm, which are disposed in a case. The case is placed in an engine compartment of an automobile. Reproduced sound is emitted to a cabin space through a duct protruding outward from the case. A partition wall, which is a metal body frame of the automobile, is present between the engine compartment and the cabin space. The duct is inserted into a hole formed in the partition wall so that a sound port faces and protrudes into the cabin space. A heat dissipation port is formed in the case, and an end surface the magnetic circuit adjacent to the partition wall is exposed in the heat dissipation port. An elastically deformable thermal conductive sheet is inserted into the heat dissipation port so as to be sandwiched between the partition wall and the end surface of the magnetic circuit.

As an improvement for the above described problem, EP 2 654 319 A2 achieves lowering of the resonance frequency by providing an air chamber having a duct that communicates with an opposite side space across the vehicle partition panel. The air chamber creates a non-elastic resistance (inertial resistance and frictional resistance) and the resonance frequency drops (for example to 70 Hz). Accordingly, a change rate of the sensitivity becomes small at a low frequency range (for example 70-100 Hz) and sound quality at the range improves. However, on the other hand, space consumption increases significantly by providing such an air chamber having a duct in a vehicle.

SUMMARY

It is an object of the present disclosure to provide a loudspeaker system which is capable of improving sound quality at a low frequency range while keeping space consumption in a vehicle quite low.

The disclosure relates to a loudspeaker system for a vehicle. Moreover, the disclosure relates to a vehicle structure and vehicle comprising such a loudspeaker system.

According to a first aspect, there is disclosed a loudspeaker system for a vehicle, comprising a vehicle partition panel that separates an interior space and an exterior space; a loudspeaker device comprising a frame, a diaphragm elastically supported at the frame, and a driving device that is configured to provide driving power for operating the diaphragm; and an air chamber disposed between the diaphragm and the vehicle partition panel. The frame delimits a chamber side opening of the air chamber facing the vehicle partition panel and the vehicle partition panel comprises a vehicle partition panel opening. The vehicle partition panel opening has an extension which is smaller than the diameter of the diaphragm and smaller than an extension of the chamber side opening. The loudspeaker device is fixed to the vehicle partition panel such that the chamber side opening and the vehicle partition panel opening overlap in an overlapping area and the chamber side opening adjoins the vehicle partition panel opening.

According to a second aspect, there is disclosed a loudspeaker system for a vehicle, comprising a vehicle partition panel that separates an interior space and an exterior space, a loudspeaker device comprising a frame, a diaphragm elastically supported at the frame, and a driving device that is configured to provide driving power for operating the diaphragm, wherein the frame is part of a housing structure which comprises a surface which is disposed parallel to and in contact with the vehicle partition panel, and an air chamber disposed between the diaphragm and the surface of the housing structure. The surface of the housing structure comprises a chamber side opening facing the vehicle partition panel and the vehicle partition panel comprises a vehicle partition panel opening, wherein at least one of the chamber side opening and the vehicle partition panel opening is smaller than the diameter of the diaphragm. The loudspeaker device is fixed to the vehicle partition panel such that the chamber side opening and the vehicle partition panel opening overlap in an overlapping area.

In forms of the disclosure, the loudspeaker device can be designed and arranged such that the resonance frequency drops and the sound quality at low frequency range improves. In addition, a space required for accommodating the loudspeaker device at the vehicle partition panel can be reduced along with space consumption in a vehicle. The vehicle partition panel, and thus the vehicle body, may be arranged to act like an infinite baffle when it separates a vehicle interior volume and the outside and both spaces are large enough not to behave like enclosures.

In some implementations, the chamber side opening in the surface of the housing structure is smaller than the vehicle partition panel opening such that the surface of the housing structure projects into the vehicle partition panel opening.

In some implementations, the loudspeaker system is configured to operate within an operating band having an upper cut-off frequency. The air chamber, the chamber side opening and the vehicle partition panel opening are arranged and dimensioned having a resonance frequency which is higher than the upper cut-off frequency of the loudspeaker system.

A duct between the air chamber and the vehicle partition panel opening is not provided. That is, the chamber side opening and the vehicle partition panel opening are communicating with said air chamber without a duct between the air chamber and the vehicle partition panel opening.

In some implementations, an opening area formed by the overlapping area of the chamber side opening and the vehicle partition panel opening is greater than 5% of an effective operating area of the diaphragm. As an effect, large or even extreme drop of the sensitivity to driving power can be avoided. As an effective operating area of the diaphragm, the area of the diaphragm shall be understood which contributes to radiation of sound from the loudspeaker, i.e. the area of the diaphragm which vibrates as a result of the driving power of the driving device.

In some implementations, an opening area formed by the overlapping area of the chamber side opening and the vehicle partition panel opening is smaller than 50% of an effective operating area of the diaphragm. Accordingly, the resonance frequency of the loudspeaker device drops and the sound quality at low frequency range improves.

In some implementations, an opening area formed by the overlapping area of the chamber side opening and the vehicle partition panel opening has a size of between 30% and 50% of an effective operating area of the diaphragm.

In some implementations, an opening area formed by the overlapping area of the chamber side opening and the vehicle partition panel opening is offset with respect to a central part of the diaphragm.

In a further implementation, the loudspeaker system is configured to emit sound by the diaphragm into an acoustic space which is opposite to the air chamber, i.e. on the side of the diaphragm which is opposite to the air chamber. Particularly, the loudspeaker system is configured such that most of the sound is radiated into an interior space of the vehicle due to the better radiation impedance matching of the speaker cone to the interior space compared to the vehicle partition panel opening impedance to the outside. The relatively small opening to the outside creates an impedance step, wherein the two impedances are not matched. Therefore, the sound radiation to the outside is not efficient and some of the sound is even reflected back into the interior space.

In some implementations, the air chamber comprises an air volume of smaller than 1 liter.

In a further implementation, the air chamber is arranged and designed such as to drain incoming water out through the chamber side opening and the vehicle partition panel opening.

In some implementations, at least one of the chamber side opening or the vehicle partition panel opening comprises one or more additional components for adapting the vehicle partition panel opening for at least one of installation, water drainage, or corrosion protection.

In a further aspect, the disclosure also relates to a vehicle structure comprising a loudspeaker system according to the invention as described herein. Further, the disclosure relates to a vehicle comprising such a loudspeaker system or a vehicle structure.

BRIEF DESCRIPTION OF THE DRAWINGS

Aspects and embodiments of the disclosure will be described with reference to the drawings, in which:

FIG. 1 shows an arrangement of a loudspeaker device according to the prior art having a rear box, FIG. 2 shows an arrangement of a loudspeaker device according to the prior art installed at an acoustic baffle panel, FIG. 8 shows a further embodiment of a loudspeaker system for a vehicle, FIG. 9 shows a diagram depicting measurements of sound output by an embodiment of a loudspeaker device for different opening diameters of the overlapping area of the chamber side opening and the vehicle partition panel opening.

DETAILED DESCRIPTION OF THE DRAWINGS

Figure 5:
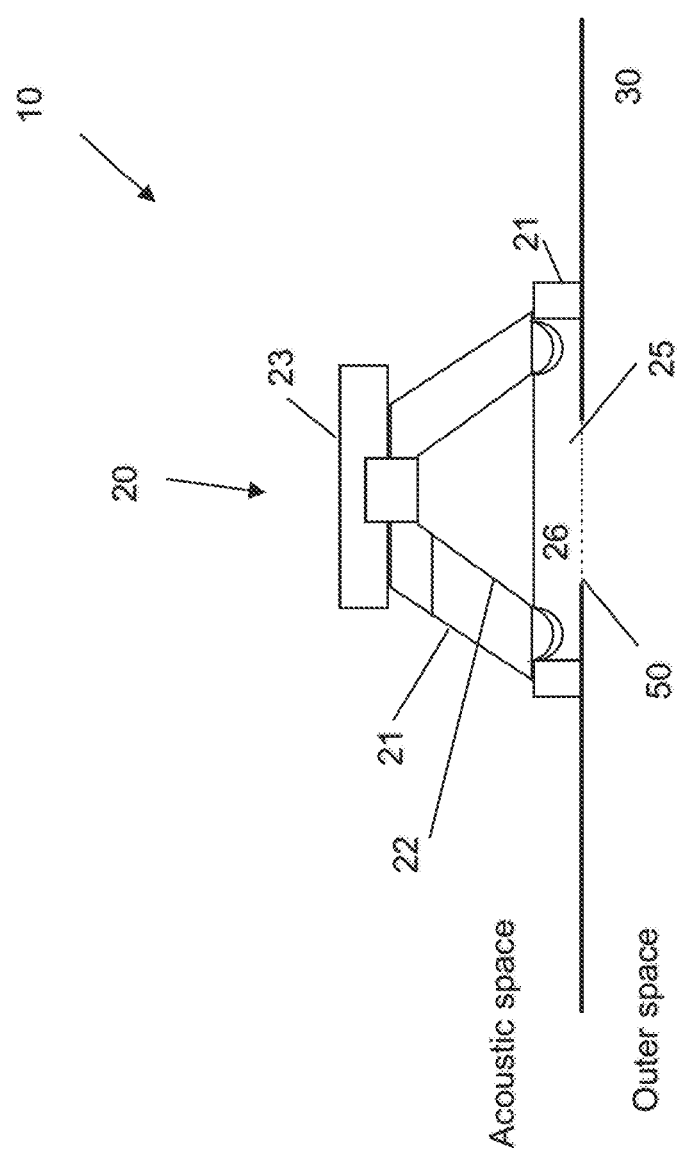
FIG. 5 shows one embodiment of a loudspeaker system for a vehicle.

FIG. 5 shows one embodiment of a loudspeaker system for a vehicle. A loudspeaker system 10 comprises a vehicle partition panel 30 that separates an interior space and an exterior space. For example, the interior space is a vehicle interior space in which the driver and any passengers are travelling. In some implementations, the interior space is an acoustic space into which sound is radiated from a loudspeaker device 20. The loudspeaker device 20 is fixed to the vehicle partition panel 30 and comprises a frame 21, a diaphragm 22 elastically supported at the frame, and a driving device 23 that is configured to provide driving power for operating the diaphragm 22. In some implementations, at the part supporting the diaphragm 22 the frame 21 is formed as a ring, shown schematically as rectangle, which creates a distance between the diaphragm 22 at its outer periphery and the vehicle partition panel 30. The frame 21 is fixed to the vehicle partition panel 30 such that an air chamber 26 is disposed between the diaphragm 22 and the vehicle partition panel 30. As such, the frame 21 delimits a chamber side opening 25 of the air chamber 26 facing the vehicle partition panel 30. In some implementations, the chamber side opening 25 has an extension (e.g. diameter) which is substantially equal to the diameter of the diaphragm 22, and in particular substantially equal to the inner extension of the frame 21 (e.g., diameter if the frame is of circular shape) spanning the vehicle partition panel opening 50.

The vehicle partition panel 30 comprises a vehicle partition panel opening 50 with an extension (e.g. diameter) which is smaller than the diameter of the diaphragm 22 and smaller than the extension (e.g. diameter) of the chamber side opening 25 overlapping with the vehicle partition panel opening 50. The loudspeaker device 20 and vehicle partition panel 30 are arranged such that the chamber side opening 25 and the vehicle partition panel opening 50 overlap in an overlapping area and the chamber side opening 25 adjoins the vehicle partition panel opening 50. That is, the chamber side opening 25 is transitioning into the vehicle partition panel opening 50 without a duct between the chamber side opening 25 and the vehicle partition panel opening 50, i.e. directly. Preferably, a sealing member such as a gasket between a periphery of the chamber side opening 25 and a periphery of the vehicle partition panel opening 50 is provided to prevent leak of back pressure to a vehicle interior space.

In some implementations, the air chamber 26 has a resonance frequency which is at least two to four times of the upper cut-off frequency of the loudspeaker system. A duct between the chamber side opening 25 and the vehicle partition panel opening 50 is not provided.

Figure 3:
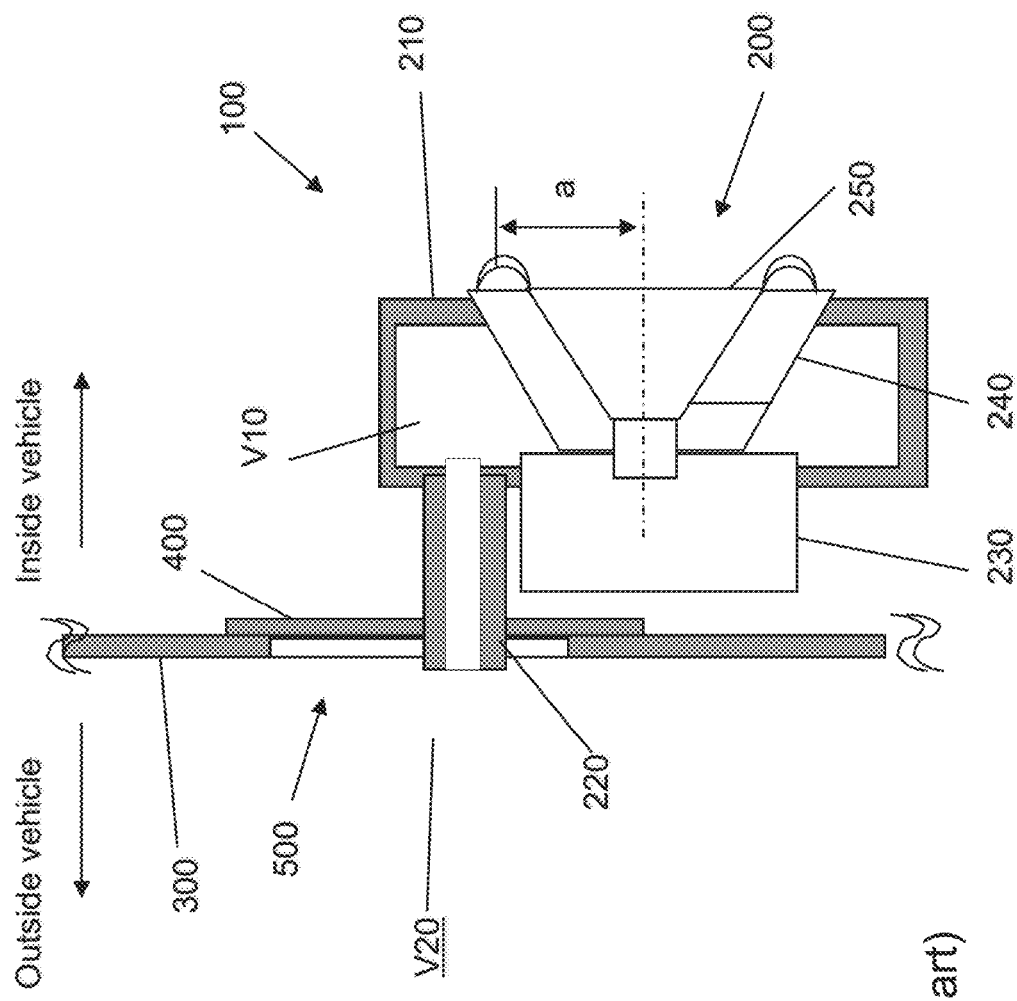
FIG. 3 shows another arrangement of a loudspeaker device according to the prior art installed at a wall of a vehicle.
Figure 4:
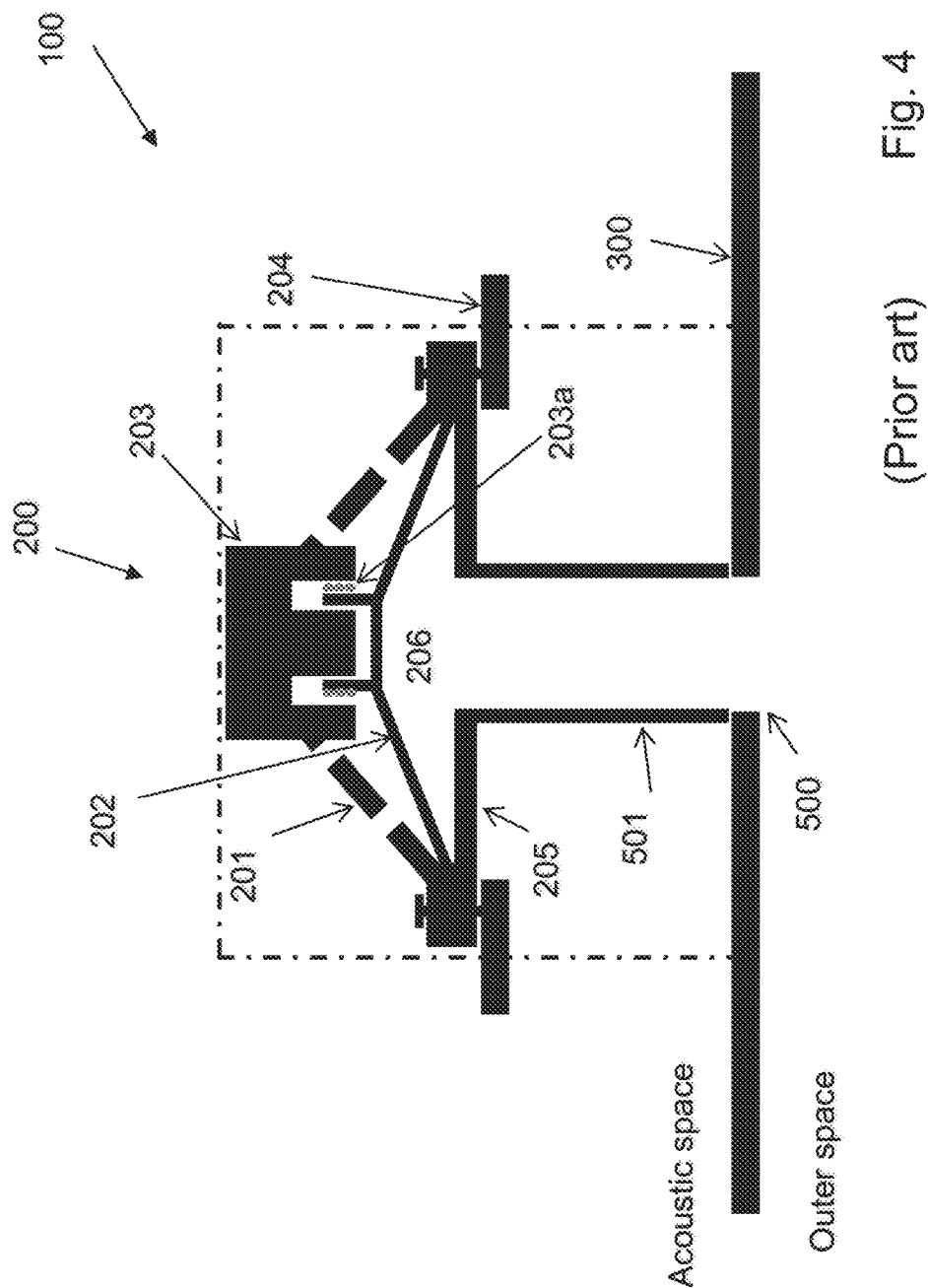
FIG. 4 shows a further arrangement of a loudspeaker device according to the prior art installed at a vehicle partition panel.

In effect, with an arrangement as described with reference to FIG. 5, the resonance frequency drops and the sound quality at low frequency range improves. Further, the space consumption in a vehicle can be reduced, as can be seen when compared to a structure as shown in FIG. 3 or 4.

Figure 6:
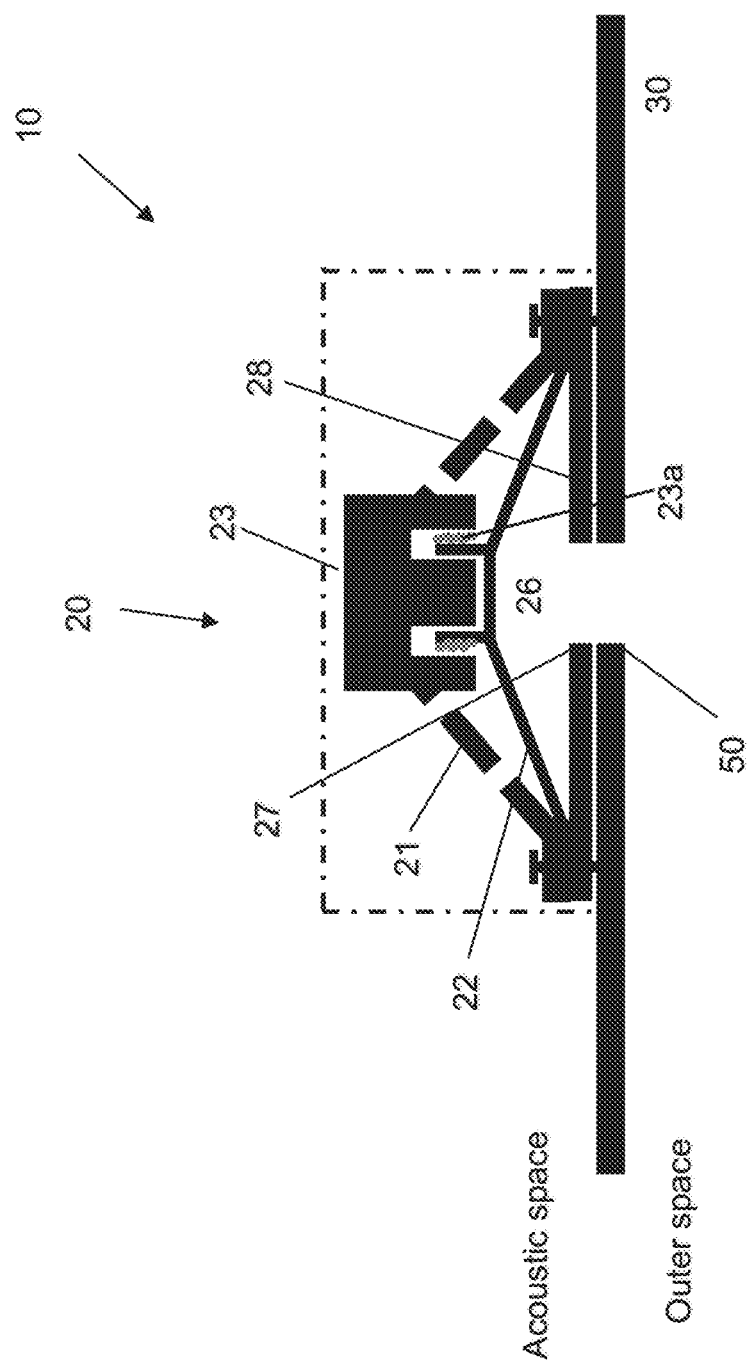
FIG. 6 shows a further embodiment of a loudspeaker system for a vehicle.

FIG. 6 shows another embodiment of a loudspeaker system for a vehicle. The loudspeaker system 10 is substantially similar to the one shown in FIG. 5. It comprises a loudspeaker device 20 with a frame 21, a diaphragm 22 elastically supported at the frame, and a driving device 23 that is configured to provide driving power for operating the diaphragm 22. As a part of the driving device 23, a voice coil 23a (not shown in FIG. 5) serves for transmitting driving power to a magnetic circuit for operating the diaphragm. Different from the embodiment described in conjunction with FIG. 5, the frame 21 is mounted to a housing structure which comprises a surface 28 which is disposed parallel to and in contact with the vehicle partition panel 30. For example, the surface 28 of the housing structure is a sheet of metal which is mounted to the frame 21, e.g. where the frame 21 supports the diaphragm 22. The housing structure may comprise further components not shown in FIG. 6. The frame 21 may be integral with the surface 28 (e.g., metal sheet) of the housing structure, or may be attached with it by suitable attaching means, such as a screw schematically shown in FIG. 6.

An air chamber 26 is disposed between the diaphragm 22 and the surface 28 of the housing structure. The surface 28, here metal sheet, of the housing structure comprises a chamber side opening 27 facing the vehicle partition panel 30 and away from the driving device 23. At least one of the chamber side opening 27 and the vehicle partition panel opening 50 has an extension which is smaller than the diameter of the diaphragm 22. The chamber side opening 27 and the vehicle partition panel opening 50 are arranged such that they at least overlap in an overlapping area. In some implementations, both openings 27 and 50 are preferably equal, preferably arranged co-axially, and have diameters smaller than the diameter of the diaphragm 22.

Accordingly, the chamber side opening 27 is directly contacting the vehicle partition panel opening 50 without a duct between the chamber side opening 27 and the vehicle partition panel opening 50. The air chamber 26, the chamber side opening 27 and the vehicle partition panel opening 50 are arranged and dimensioned such that they form an acoustic resonant system, in particular a Helmholtz resonator. The acoustic resonant system has preferably a resonance frequency which is at least two to four times of the upper cut-off frequency of the loudspeaker system. The acoustic resonant system, in particular Helmholtz resonator, is formed without a duct between the chamber side opening 27 and the vehicle partition panel opening 50.

In effect, with an arrangement as described with reference to FIG. 6, the resonance frequency drops and the sound quality at low frequency range improves. Further, the space consumption in a vehicle can be reduced, as can be seen when compared to a structure as shown in FIG. 3 or 4.

Figure 7:
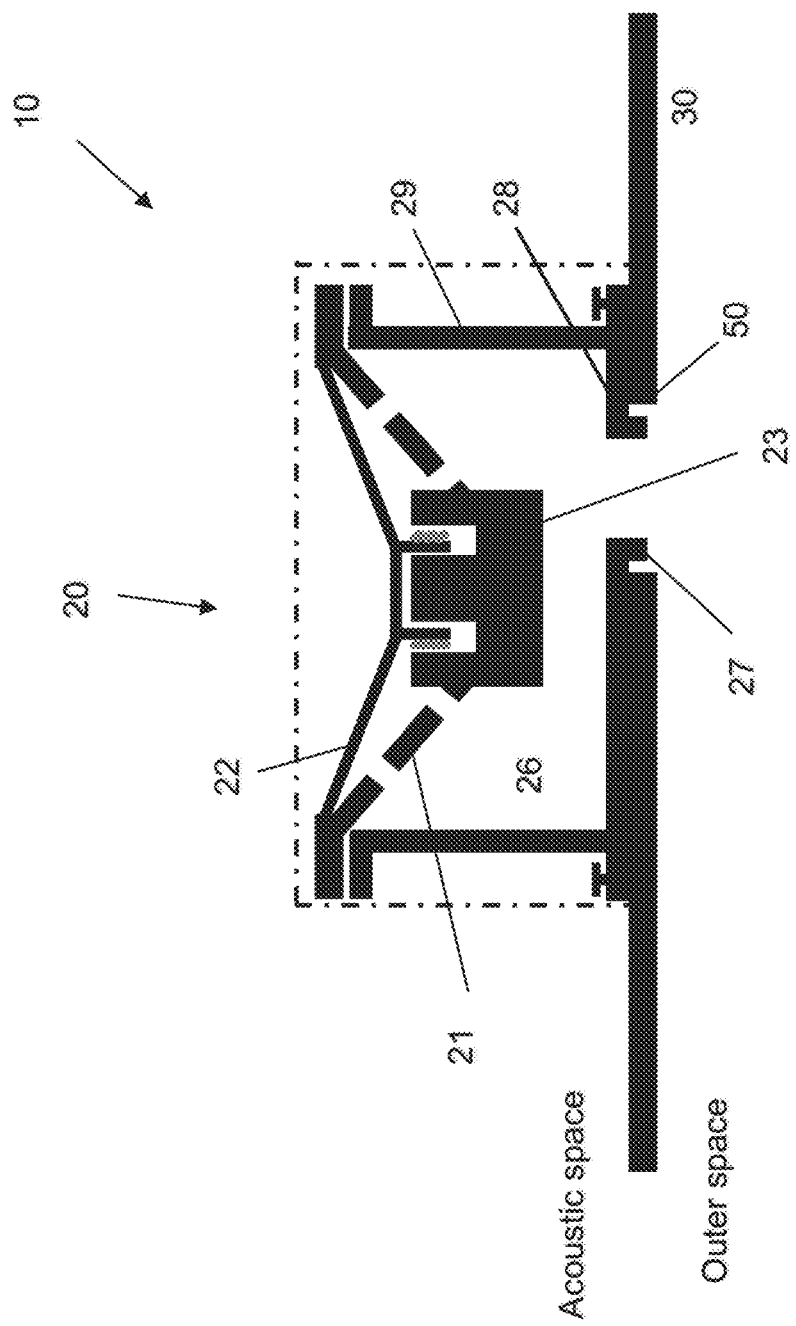
FIG. 7 shows a further embodiment of a loudspeaker system for a vehicle.

FIG. 7 shows another embodiment of a loudspeaker system for a vehicle. The majority of components is the same as described above with reference to FIG. 6, so that the arrangement thereof will not be described again for reasons of brevity. Different from the embodiment described above in conjunction with FIG. 6, the housing structure of the loudspeaker device 20 comprises a further component 29 attached or integral with the surface (e.g. metal sheet) 28 as described above. The component 29 may be a cylindrically formed sheet metal perpendicularly arranged to the sheet metal 28 for supporting the frame 21 at the vehicle partition panel 30 in order change the direction of the diaphragm 22 and driving device 23 now facing with the conus inner side towards the acoustic space (i.e. upwards). In this implementation, the chamber side opening 27 is smaller than the vehicle partition panel opening 50 such that the metal sheet 28 of the housing structure projects into the vehicle partition panel opening 50. In some implementations, an opening area formed by the overlapping area of the chamber side opening 27 and the vehicle partition panel opening 50 is offset with respect to a central part of the diaphragm 50, i.e. offset with respect to the driving device 23.

FIG. 8 shows another embodiment of a loudspeaker system for a vehicle. The majority of components is the same as described above with reference to FIGS. 6 and 7, so that the arrangement thereof will not be described again for reasons of brevity. In this embodiment, the loudspeaker system 20 is configured to emit sound by the diaphragm 22 into an acoustic space which is on the side of the air chamber 26 and the side of the vehicle partition panel 30 opposite to the loudspeaker device 20. In the other embodiments described above in conjunction with FIGS. 5-7, sound is emitted by the diaphragm 22 into an acoustic space which is opposite to the air chamber 26 and on the side of the vehicle partition panel 30 where the loudspeaker device 20 is attached. For example, the loudspeaker device 20 can be disposed in an outer space of the vehicle, such as a trunk or an outer side of a door panel. In this embodiment, the vehicle partition panel opening 50 is smaller than the chamber side opening 27.

In all embodiments shown, an opening area formed by the overlapping area of the chamber side opening 25, 27 and the vehicle partition panel opening 50 may be preferably greater than 5% of the effective operating area of the diaphragm 22. As such, extreme drop of the sensitivity to driving power can be avoided. Further, the opening area is preferably smaller than 50% of the effective operating area of the diaphragm 22. Thus, the resonance frequency drops and the sound quality at low frequency range improves.

Particularly, the opening area formed by the overlapping area of the chamber side opening 25, 27 and the vehicle partition panel opening 50 has a size of between 30% and 50% of the effective operating area of the diaphragm 22.

In some implementations, the air chamber 26 comprises an air volume of smaller than 1 liter. In some forms, the opening area formed by the overlapping area of the chamber side opening 25, 27 and the vehicle partition panel opening 50 has a diameter significantly smaller than the diaphragm diameter, typically ⅓ to ½ in diameter. The vehicle body acts like an infinite baffle, because it separates the vehicle interior volume and the outside and both spaces are large enough not to behave like enclosures.

In the embodiments described above in conjunction with FIGS. 5-7, most of the sound will be radiated into the vehicle due to the better radiation impedance matching of the speaker cone to the interior space compared to the vehicle partition panel opening impedance to the outside. The relatively small hole to the outside creates an impedance step, wherein the two impedances are not matched. Therefore, the sound radiation to the outside is not efficient and some of the sound is even reflected back into the vehicle.

The air chamber 26 may be designed to drain incoming water back out through the chamber side opening 25, 27. Additional components to shape the port exit for better installation, water drainage, corrosion protection etc. may be installed, but these are acoustically not required. The opening area formed by the overlapping area of the chamber side opening 25, 27 and the vehicle partition panel opening 50 should be as thin and/or short as possible. The orientation of the assembly is not important, but if the opening area is exposed to moisture or water, it should be ensured that this is drained or controlled not to damage the speaker in case of freezing.

FIG. 9 shows a diagram depicting measurements of sound output by one embodiment of a loudspeaker device for different opening diameters (from 40 mm to 200 mm) of the overlapping area of the chamber side opening and the vehicle partition panel opening. This diagram shows measurements of acoustic level (in dB) depending on the frequency of sound (in Hz) output by the loudspeaker device 20. When the diameter of the opening area formed by the overlapping area of the chamber side opening 25, 27 and the vehicle partition panel opening 50 is 100% (i.e. equal to the diameter of the diaphragm 22), the resonance frequency is around 100 Hz and the sensitivity variation according to the frequency variation at a range under 100 Hz is large. Generally, such performance is not so good for a sub-woofer or woofer. When the opening area is 5%-50% of the area of the diaphragm 22, the resonance frequency becomes lower and the sensitivity variation according to the frequency variation at a lower range below 100 Hz becomes smaller. Such performance (such as shown for a practical range at 50 mm diameter of the opening) is quite good for a sub-woofer or woofer. When the diameter of the opening is under 5%, the sensitivity becomes too small which is not so good for a speaker.

The loudspeaker system may advantageously be attached to a vehicle structure, such as a door structure, or vehicle structure like a partition wall or dashboard of the vehicle separating an engine compartment or trunk from an inner space of the vehicle (not shown). The loudspeaker system may in principle be comprised in any kind of vehicle structure suitable for arranging a loudspeaker system.

While the present disclosure is described in terms of some specific examples, embodiments, and implementations, the present disclosure is not limited to these examples and embodiments and the contents of the present disclosure should not be interpreted in a limited way. It will be clear that any changes and modified embodiments will be evident to those skilled in the art without departing from the scope of the claims.

It is therefore intended that the foregoing detailed description be regarded as illustrative rather than limiting, and that it be understood that it is the following claims, including all equivalents, that are intended to define the spirit and scope of this invention.

What is claimed is:

1. A loudspeaker system for a vehicle, comprising:
a vehicle partition panel that separates an interior space that is interior to the vehicle and an exterior space that is exterior to the vehicle, wherein the vehicle partition panel is configured to acoustically isolate a portion of the interior space from the exterior space;
a loudspeaker device comprising a frame, a diaphragm elastically supported at the frame, and a driving device that is configured to provide driving power for operating the diaphragm; and
an air chamber disposed between the diaphragm and the vehicle partition panel;
wherein the frame delimits a chamber side opening of the air chamber facing the vehicle partition panel and the vehicle partition panel comprises a vehicle partition panel opening,
wherein the vehicle partition panel opening has an extension which is smaller than the diameter of the diaphragm and smaller than an extension of the chamber side opening, and
wherein the loudspeaker device is fixed to the vehicle partition panel such that the chamber side opening and the vehicle partition panel opening overlap in an overlapping area and the chamber side opening adjoins the vehicle partition panel opening.

2. The loudspeaker system according to claim 1, wherein:
the loudspeaker system is configured to operate within an operating band having an upper cut-off frequency, and
the air chamber, the chamber side opening, and the vehicle partition panel opening are arranged and dimensioned having a resonance frequency which is higher than the upper cut-off frequency of the loudspeaker system.

3. The loudspeaker system according to claim 1, wherein a sealing member between a periphery of the chamber side opening and a periphery of the vehicle partition panel opening is provided.

4. The loudspeaker system according to claim 1, wherein an opening area formed by the overlapping area of the chamber side opening and the vehicle partition panel opening is greater than 5% of an effective operating area of the diaphragm.

5. The loudspeaker system according to claim 1, wherein an opening area formed by the overlapping area of the chamber side opening and the vehicle partition panel opening is smaller than 50% of an effective operating area of the diaphragm.

6. The loudspeaker system according to claim 1, wherein an opening area formed by the overlapping area of the chamber side opening and the vehicle partition panel opening has a size of between 30% and 50% of an effective operating area of the diaphragm.

* * * * *